Patented July 23, 1935

2,009,345

UNITED STATES PATENT OFFICE 2,009,345

EMULSIFIABLE WAXES

Walther Schrauth, Berlin-Dahlem, Germany, assignor, by mesne assignments, to "Unichem" Chemikalien Handels A.-G., Zurich, Switzerland, a corporation of Switzerland No Drawing. Application December 22, 1933, Serial No. 703,604. In Germany December 20, 1932

7 Claims. (Cl. 87—19)

The present invention relates to waxes and has for an object to provide an improved emulsifiable wax having as a base a hard wax of the type represented by Montan wax, carnauba wax and beeswax.

A further object is to provide an improved method of producing emulsions of waxes of the type under consideration.

Hard waxes such as those mentioned which may be described as consisting principally of esters of high molecular primary normal straight chain aliphatic acids, having at least 8 carbon atoms in the molecule and high molecular alcohols of corresponding molecular structure, carnauba wax and beeswax being examples of this type, or as mineral waxes of the type of Montan wax as distinguished from glycerides, persistently resist emulsification with water. The term non-glyceride hard wax is used in claims to define these waxes. It has been discovered in accordance with the present invention that if waxes of this type are combined with both a suitable organic sulfonate or sulfate and a suitable high molecular alcohol satisfactory emulsions can be produced. The sulfate or sulfonate may be the reaction product of sulfuric acid and a high molecular alcohol or hydroxy acid having 8 or more carbon atoms in the molecule. The sulfates or sulfonates of those normal straight chain aliphatic alcohols having 16 or more carbon atoms in the molecule are preferable to those of the relatively lower molecular alcohols. The sulfates or sulfonates used may be produced by reaction at the hydroxyl group from the mono-hydric or di-hydric alcohols or from the hydroxy acids, as for example octyl, decyl, dodecyl, cetyl, stearyl, eicosyl, ceryl, myricyl, oleyl, ricinoleyl alcohols, octadecandiol, ricinoleic acid, hydroxy-stearic acid and similar compounds. The term "sulfuric derivative of a fatty alcohol" is used in the claims to define either a sulfate or sulfonate compound of such character and is not to be construed in a broader sense as including other compounds having a sulfuric radical and an alcohol radical such as the derivatives of the ethers, esters or the like. The alcohols which are combined with the sulfates may be those aliphatic alcohols of fatty character having 16 or more carbon atoms in the molecule as for example, cetyl, stearyl, eicosyl, ceryl, myricyl, oleyl, ricinoleyl, octadecandiol and hydroxy acids such as ricinoleic hydroxy stearic and and its homologues. They may be saturated or unsaturated and monohydric or di-hydric. The saturated compounds are preferred.

A preferred method of preparing the alcohol and the sulfonic acid or sulfuric acid ester or the salts of either, consists of reacting high molecular alcohol, which may be a mixture of different alcohols having at least 16 carbon atoms in the molecule with little, if any, alcohol of lower molecular structure, with sulfuric acid or chloro-sulfonic acid, the proportion of the acid being of the order of one-half that necessary to react with all of the alcohol. The temperature of reaction may vary with the starting materials and the proportion of sulfonic acid and sulfuric acid esters employed. The product may be used as thus produced or it may be neutralized with an alkali metal or ammonium which is for most purposes an equivalent. Such a mixture will have relatively equal parts of alcohol and sulfate or sulfonate.

The proportion of the alcohol and sulfuric acid ester or sulfonic acid or the salts of either or both to the alcohol may vary considerably, preferably they are added in generally equal proportions but the proportion of the alcohol may be considerably increased or diminished, for example, so that it is between 25 and 75% of the mixture of alcohol and sulfate or sulfonate.

The proportion of the addition material consisting of alcohol and sulfate, etc., may vary considerably. Preferably the addition material should approximate 20% of the whole composition, a satisfactory emulsifiable wax may have between 5 and 50% of the addition material and for many purposes the addition material may range outside of these limits.

The products compounded as herein indicated are wax-like compositions which in a molten condition can be emulsified with water for use. They yield a high gloss on wood, polished metal, enamelled and like surfaces and on leather and other similar materials. The gloss is enduring against dampness. The compositions are effective for impregnating and waterproofing close woven fabrics and similar materials.

When used as treating materials for fibrous material such as raw cotton, artificial silk and the like they give a soft feel to the material.

Example I 10 parts of sodium sulfate of octadecyl alcohol and 10 parts of cetyl-alcohol are slowly added to 90 parts of molten, refined carnauba wax by stirring at a temperature of 95° C.

Example II

Hydroxy-stearic acid is converted into a sulfuric acid ester by the treatment with sulfonation agents after which the sodium salt is produced. 15 parts of this salt are introduced into a molten mass, consisting of 40 parts of bleached Montan wax, 25 parts of beeswax and 20 parts of octadecandiol.

*Example III*

Hardened rape seed oil is converted into a mixture of octa-decyl and docosyl alcohol by means of high pressure-hydrogenation. This alcohol mixture is sulfonated with one half of the quantity of chloro-sulfonic acid necessary for complete esterification, and then the product is neutralized with soda lye. 30 parts of the anhydrous product are melted together with 45 parts of carnauba wax, 20 parts of beeswax and 5 parts of hydroxy-stearic acid.

The foregoing particular description is illustrative merely and is not intended as defining the limits of the invention.

I claim:

1. An emulsifiable wax composition comprising, in combination, a hard wax consisting principally of esters of primary normal straight chain monohydric aliphatic alcohol having 8 or more carbon atoms in the molecule and primary normal straight chain aliphatic acid having 8 or more carbon atoms in the molecule, fatty alcohol having 16 or more carbon atoms in the molecule and a sulfuric derivative of a fatty alcohol having 8 or more carbon atoms in the molecule.

2. An emulsifiable wax composition comprising, in combination, a hard wax consisting principally of esters of primary normal straight chain monohydric aliphatic alcohol having 8 or more carbon atoms in the molecule and primary normal straight chain aliphatic acid having 8 or more carbon atoms in the molecule, fatty alcohol having 16 or more carbon atoms in the molecule, and a sulfuric derivative of a fatty alcohol having 16 or more carbon atoms in the molecule.

3. An emulsifiable wax composition comprising, in combination, a hard wax consisting principally of esters of primary normal straight chain monohydric aliphatic alcohol having 8 or more carbon atoms in the molecule and primary normal straight chain aliphatic acid having 8 or more carbon atoms in the molecule, normal primary monohydric straight chain saturated alcohol having 16 or more carbon atoms in the molecule, and sulfuric acid esters of fatty alcohol having 8 or more carbon atoms in the molecule.

4. An emulsifiable wax composition comprising, in combination, a hard wax consisting principally of esters of primary normal straight chain monohydric aliphatic alcohol having 8 or more carbon atoms in the molecule and primary normal straight chain aliphatic acid having 8 or more carbon atoms in the molecule, normal primary monohydric straight chain saturated alcohol having 16 or more carbon atoms in the molecule, and sulfuric acid esters of fatty alcohol having 16 or more carbon atoms in the molecule.

5. An emulsifiable wax composition comprising, in combination, a hard wax consisting principally of esters of primary normal straight chain monohydric aliphatic alcohol having 8 or more carbon atoms in the molecule and primary normal straight chain aliphatic acid having 8 or more carbon atoms in the molecule, fatty alcohol having 16 or more carbon atoms in the molecule and a sulfuric derivative of a fatty alcohol having 8 or more carbon atoms in the molecule in a proportion approximating 100 parts of wax to 10 parts of alcohol and 10 parts of sulfate or sulfonate.

6. The method of producing waxes capable of emulsifying in water which comprises adding to a gloss yielding non-glyceride hard wax, a sulfuric derivative of a high molecular fatty alcohol, together with fatty alcohol having 16 or more carbon atoms in the molecule as an emulsifying agent.

7. An emulsifiable wax composition comprising, in combination, a non-glyceride hard wax, fatty alcohol having 16 or more carbon atoms in the molecule and a sulfuric derivative of a fatty alcohol having 8 or more carbon atoms in the molecule.

WALTHER SCHRAUTH.